United States Patent
Huang

(10) Patent No.: US 6,619,877 B1
(45) Date of Patent: Sep. 16, 2003

(54) STRUCTURE FOR POSITIONING AN EXPANDABLE ROD OF A TREE PRUNER

(76) Inventor: Yo-Hsin Huang, Sec. 4, Yen Hai Rd., Fu Shing Hsiang, Chang Hua Hsien (TW)

( * ) Notice: Subject to any disclaimer, the term of this patent is extended or adjusted under 35 U.S.C. 154(b) by 12 days.

(21) Appl. No.: 10/040,236

(22) Filed: Jan. 8, 2002

(51) Int. Cl.$^7$ ................................................. B25G 3/20
(52) U.S. Cl. ................ 403/351; 403/109.5; 403/350; 403/352; 16/429; 30/340
(58) Field of Search ............... 16/429; 83/698.11; 81/177.2; 294/19.1; 403/343, 350–352, 109.5; 30/340, 341, DIG. 5, 121, 122

(56) References Cited

U.S. PATENT DOCUMENTS

| | | | | |
|---|---|---|---|---|
| 5,011,319 A | * | 4/1991 | Levi et al. | ................ 403/109 |
| 5,460,458 A | * | 10/1995 | Caceres | ................ 403/109 |
| 5,692,856 A | * | 12/1997 | Newman, Jr. et al. | ...... 403/352 |
| 2002/0096204 A1 | * | 7/2002 | Lin | ................ 135/25.4 |

* cited by examiner

Primary Examiner—Lynne H. Browne
Assistant Examiner—Michael P. Ferguson
(74) Attorney, Agent, or Firm—Harrison & Egbert

(57) ABSTRACT

An expandable rod of a tree pruner is formed of an outer tube and an inner tube, which are located by a drive block and a stop block such that a first end of the drive block is retained in a first tightening recess and stopped by a first check edge of a first protrusion of the stop block, and that a second end of the drive block is retained in a second tightening recess and stopped by a first check edge of a second protrusion of the stop block.

1 Claim, 8 Drawing Sheets

STRUCTURE FOR POSITIONING AN EXPANDABLE ROD OF A TREE PRUNER

BACKGROUND OF THE INVENTION

1. Field of the Invention

The present invention relates generally to a tree pruner, and more particularly to a positioning or locating structure of an expandable rod of the tree pruner.

2. Description of Related Art

The tree pruner is generally provided with an expandable rod to facilitate the removing of dead or living parts of a tall plant.

As shown in FIGS. 1–4, an expandable rod of the prior art is formed of an inner tube 50 and an outer tube 60. The inner tube 50 is slidably fitted into the outer tube 60, thereby enabling the expandable rod of the prior art to be adjusted in length. The inner tube 50 is provided at one end with a drive block 51, which is located by a stop block 52. The stop block 52 is provided with a through slot 53, an Inner slot 54 opposite in location to the through slot 53, and two eccentric arcuate recesses 55. The eccentric arcuate recesses 55 are provided with a stop projection 56. The stop block 52 is provided in the outer wall with two reverse ratchet portions 57. The stop block 52 is rotatably joined with the drive block 51 of the inner tube 50. In light of the contact surface between the drive block 51 and the eccentric arcuate recess 55 of the stop block 52 being smooth, the drive block 51 is apt to slide at the time when the outer tube 60 is twisted slightly. As a result, the inner tube 50 and the outer tube 60 can not be securely located. The work efficiency of the tree pruner is thus adversely affected. In addition, the stop projections 56 are vulnerable to damage which is caused by the impact of the drive block 51, as illustrated in FIG. 3.

BRIEF SUMMARY OF THE INVENTION

The primary objective of the present invention is to provide a structure for locating securely an expandable rod of the tree pruner.

The locating structure of the present invention comprises an outer tube, an inner tube provided at one end with a drive block, and a stop block which is fitted over the drive block such that the stop block serves to locate securely the outer tube and the inner tube.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
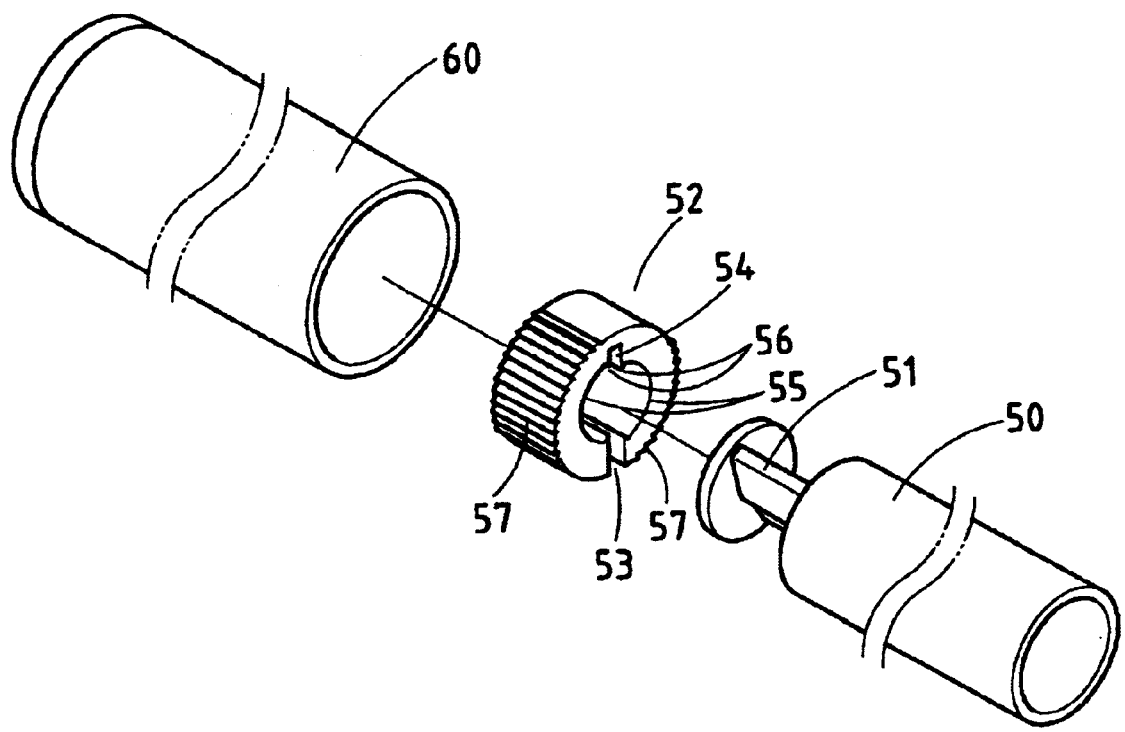
FIG. 1 shows an exploded view of a locating structure of the prior art.
Figure 2:
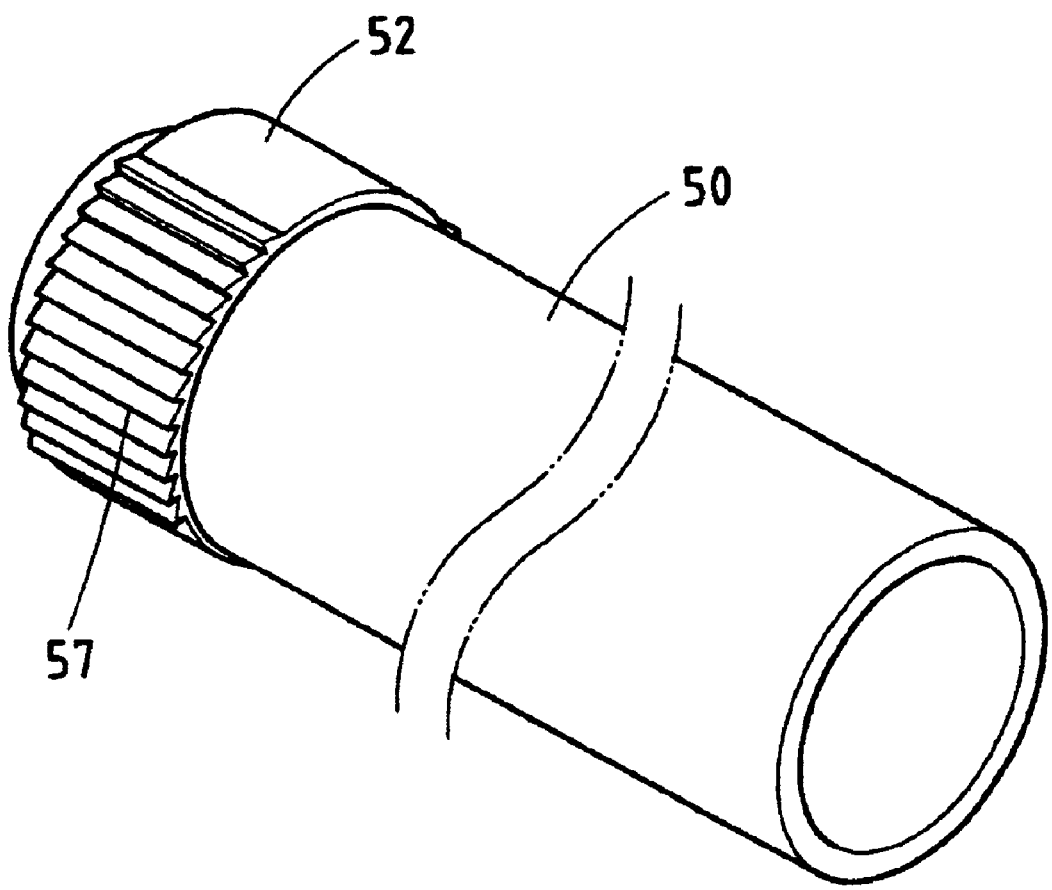
FIG. 2 shows a perspective view of the prior art locating structure.
Figure 3:
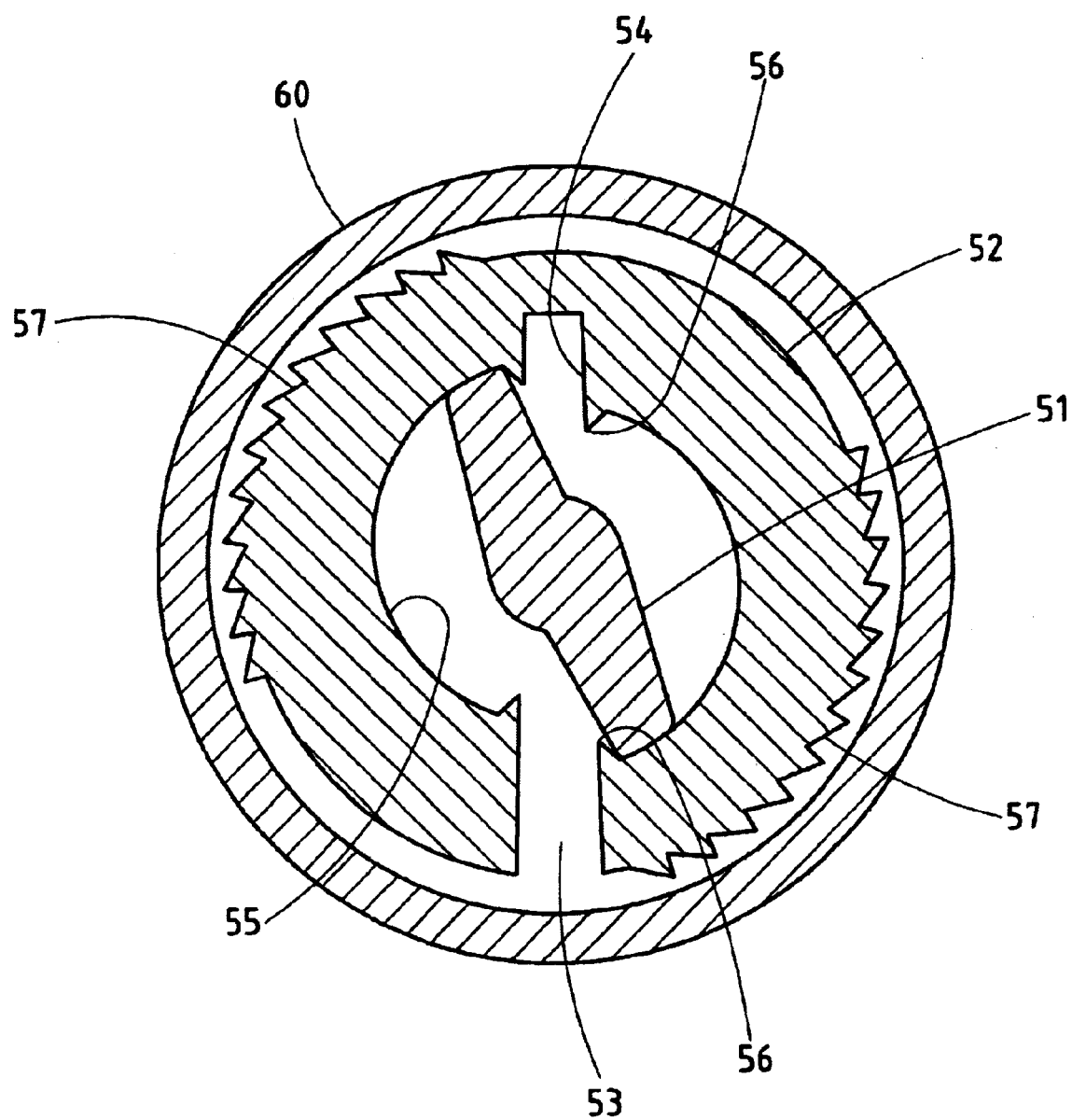
FIG. 3 shows a schematic view of the prior art locating structure in the loosening state.
Figure 4:
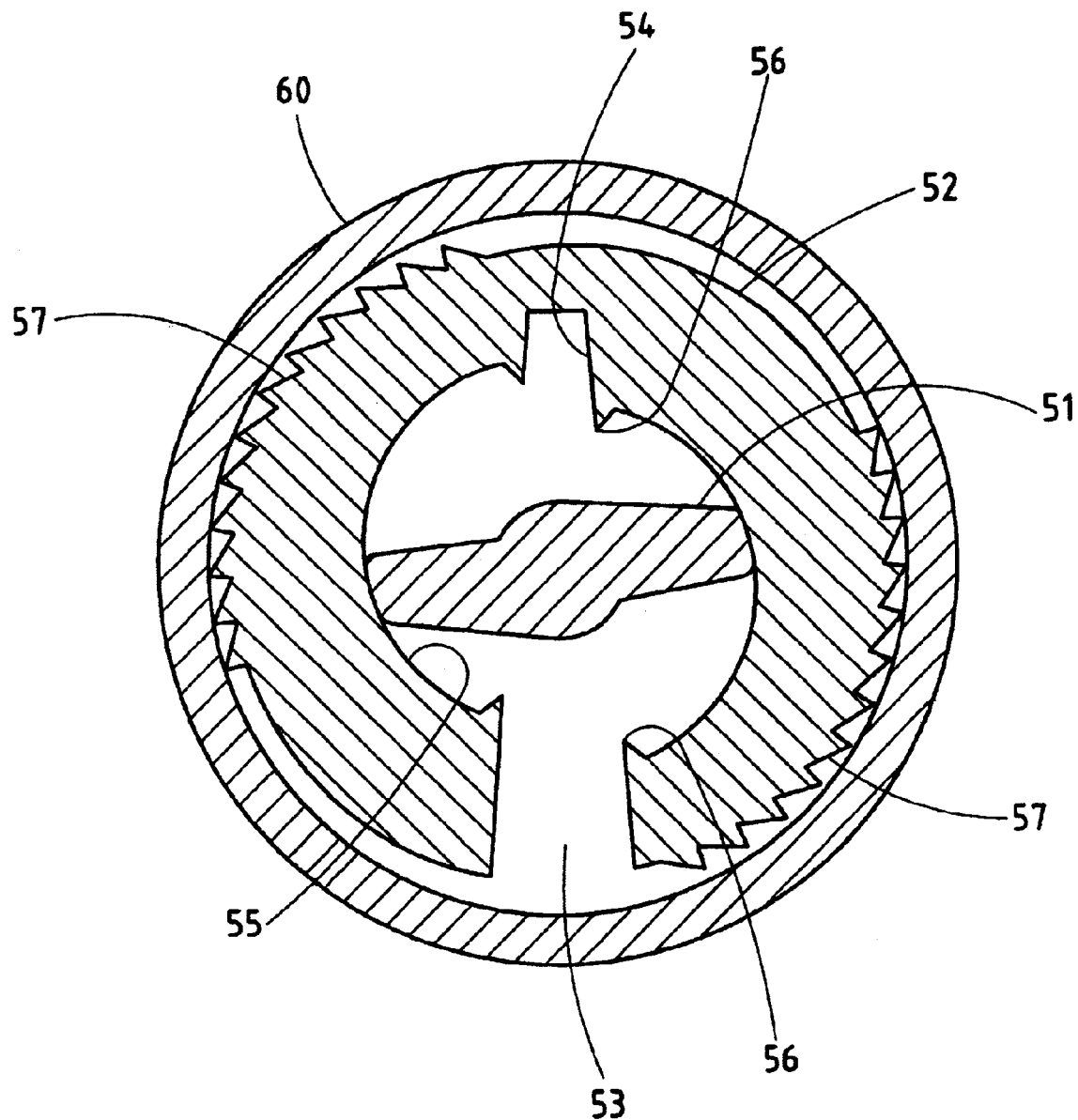
FIG. 4 shows a schematic view of the prior art locating structure in the tightening state.
Figure 5:
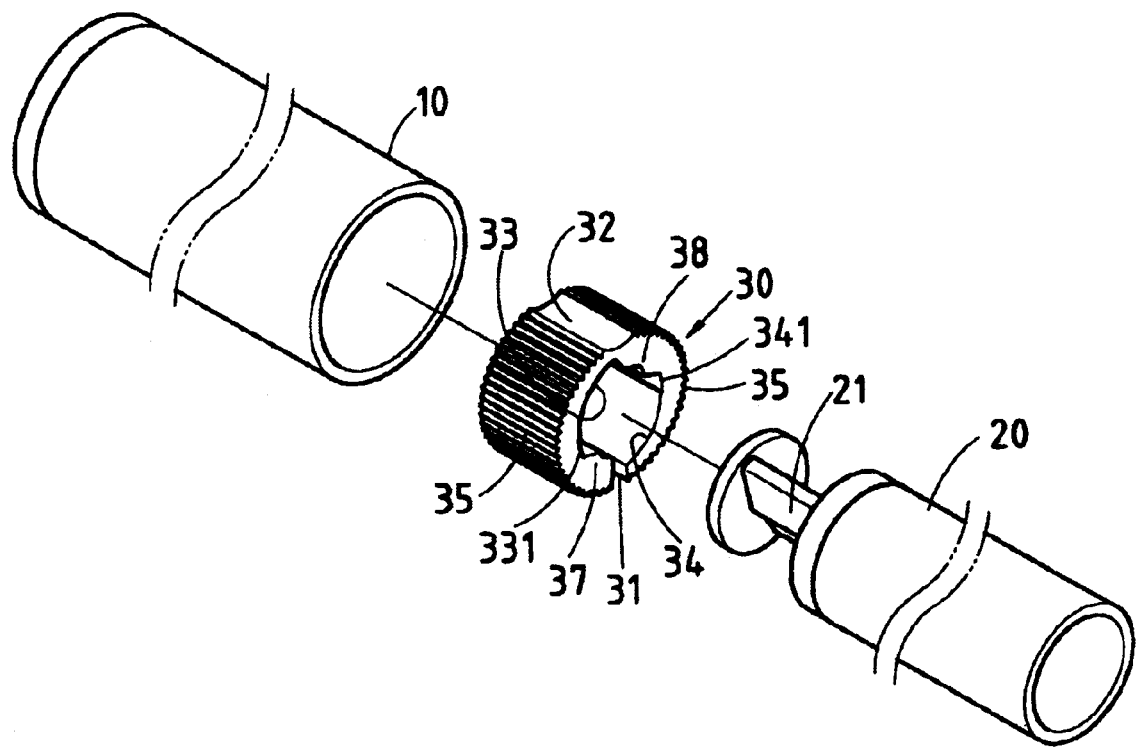
FIG. 5 shows an exploded view of the preferred embodiment of the present invention.

As shown in FIGS. 5–8, a structure embodied in the present invention is intended to locate securely an expandable rod of the tree pruner and is formed of an outer tube 10, an inner tube 20, a drive block 21, and a stop block 30.

The inner tube 20 is slidably fitted into the outer tube 10 and is provided at one end with the drive block 21 fastened therewith.

The stop block 30 has a hollow interior, a longitudinal through slot 31 in communication with the hollow interior, and an arcuate slot 32 which is formed in the outer wall of the stop block 30 such that the arcuate slot 32 is corresponding in location to the through slot 31. As a result, the stop block 30 has two symmetrical portions which are respectively provided in the inner wall thereof with an eccentric arcuate recess 33, 34, and in the outer wall thereof with a ratchet portion 35. The stop block 30 is fitted over the drive block 21 of the inner tube 20 such that the stop block 30 is forced to tightened up at such time when the outer tube 10 and the inner tube 20 are turned in relation to each other.

The present invention is characterized by the eccentric arcuate recesses 33 and 34 of the stop block 30. The first eccentric arcuate recess 33 is provided with a first tightening recess 331 for locating a first end 22 of the drive block 21. The second eccentric arcuate recess 34 is provided with a second tightening recess 341 for locating a second end 23 of the drive block 21. The first end 22 and the second end 23 of the drive block 21 are opposite in location to each other. Located in proximity of the first tightening recess 331 is a first protrusion 37 which is provided with a first check edge 371 and a second check edge 372. Similarly-, the second eccentric arcuate recess 34 is provided with a second protrusion 38 which is located in proximity of the second tightening recess 341 and is provided with a first check edge 381 and a second check edge 382.

Figure 6:
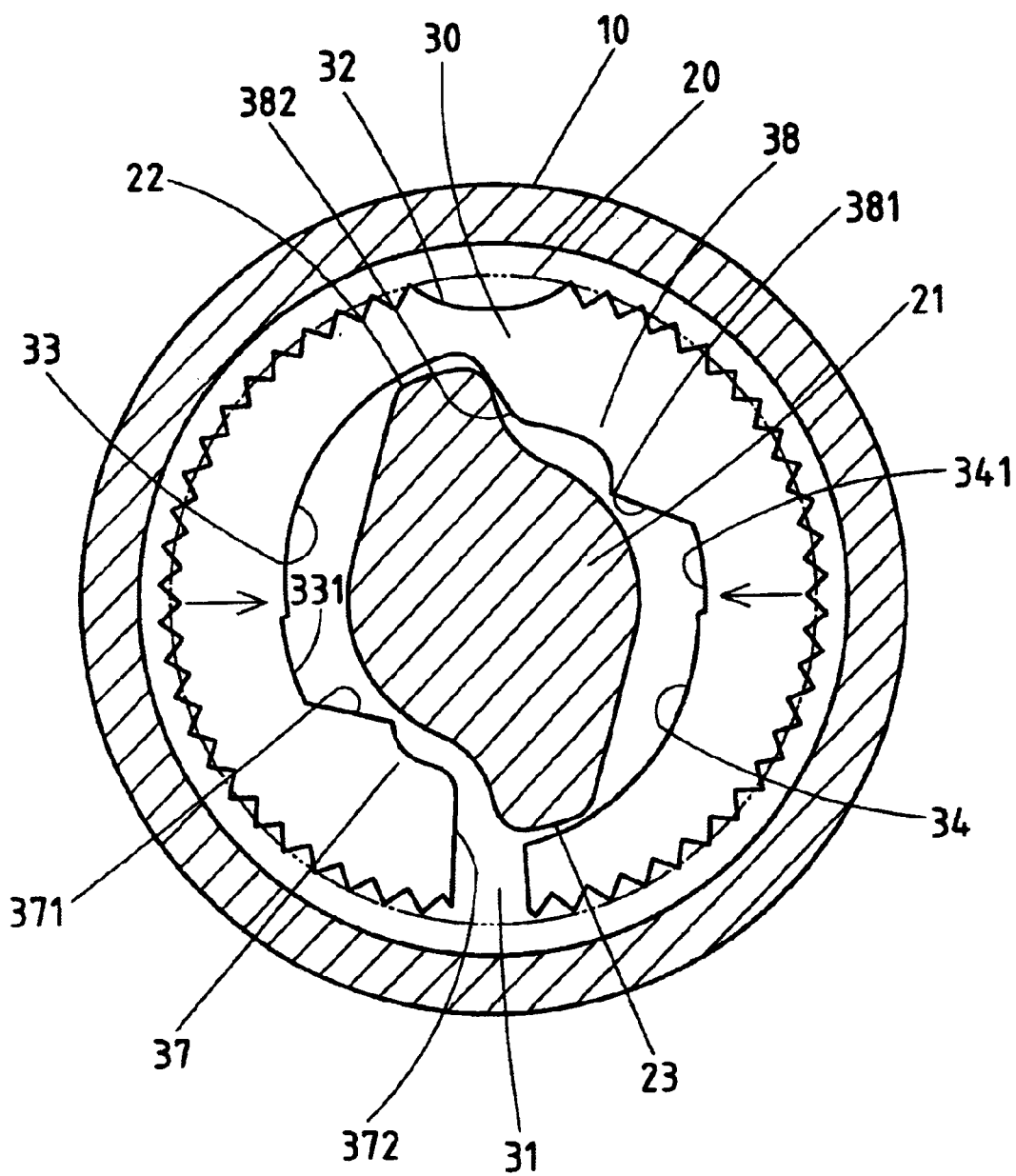
FIG. 6 shows a cross-sectional schematic view of the preferred embodiment of the present invention in the loosening state.
Figure 7:
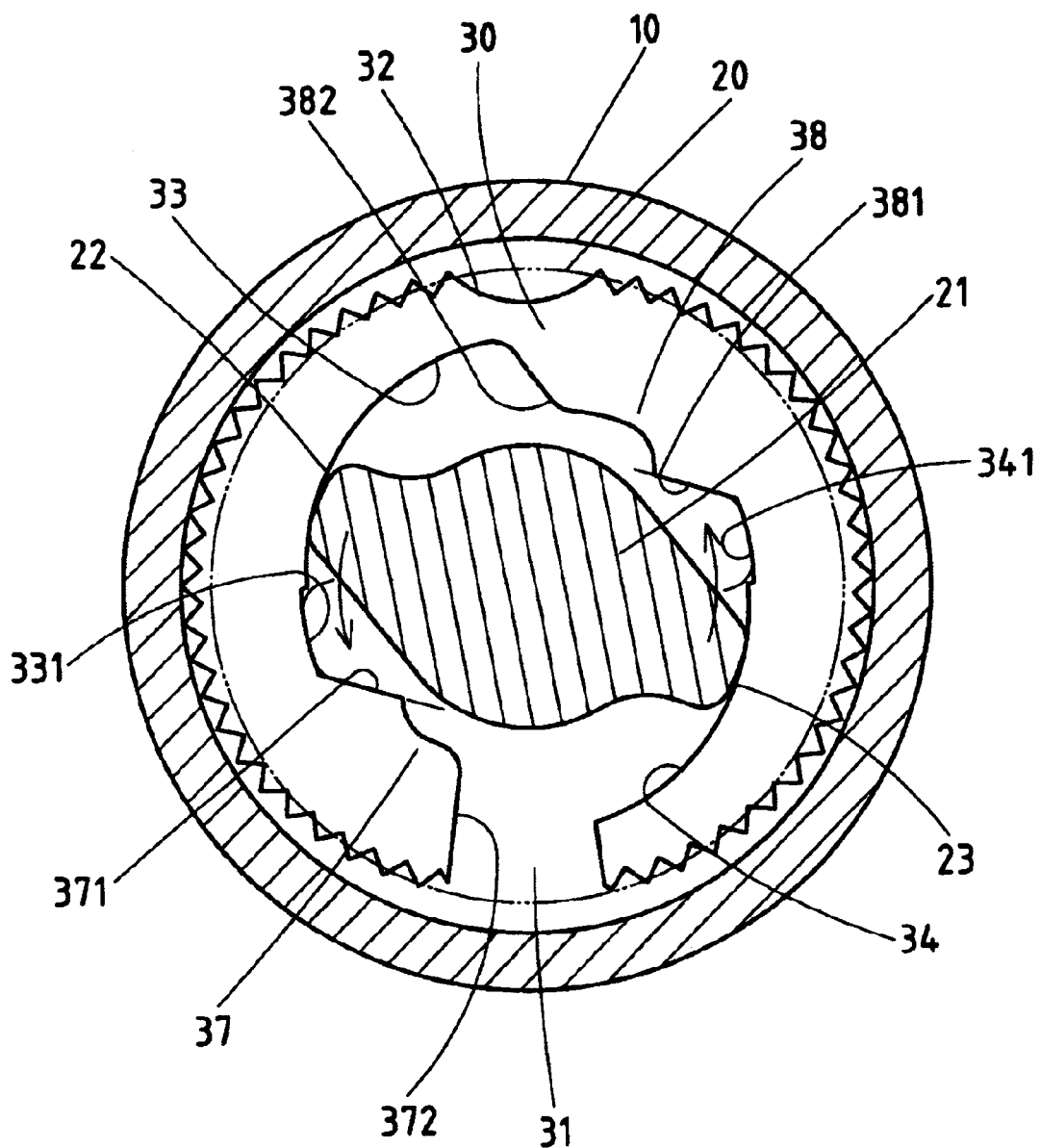
FIG. 7 shows a cross-sectional schematic view of the preferred embodiment of the present invention in the adjusting state.
Figure 8:
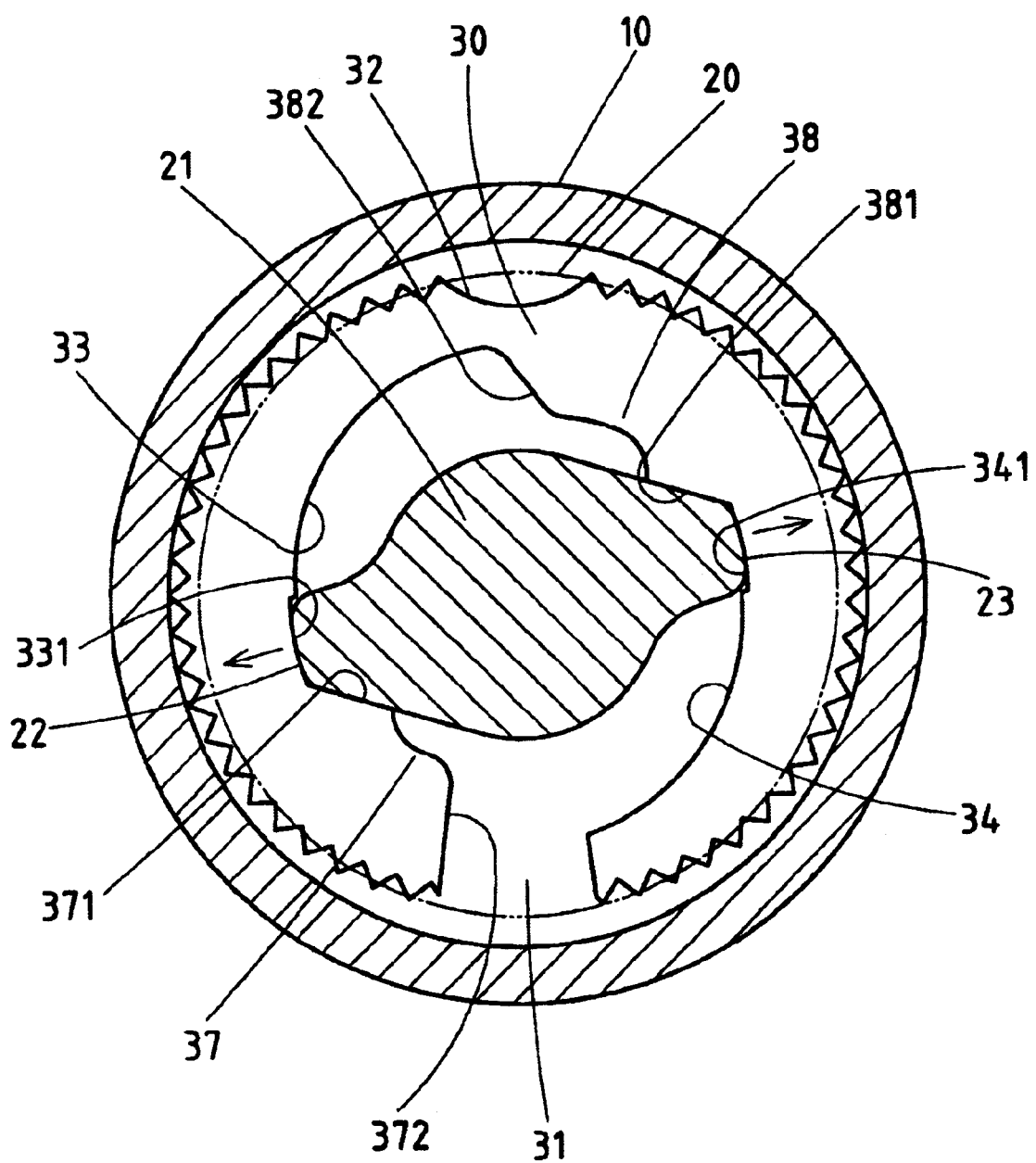
FIG. 8 shows a cross-sectional schematic view of the preferred embodiment of the present invention in the tightening state.

As shown in FIG. 6, the drive block 21 and the stop block 30 are in the loosening state such that the first end 22 of the drive block 21 is located away from the first protrusion 37 of the first eccentric arcuate recess 33, and that the first end 22 of the drive block 21 is stopped by the second check edge 382 of the second protrusion 38 of the second eccentric arcuate recess 34, and further that the second end 23 of the drive block 21 is stopped by the second check edge 372 of the first protrusion 37. As a result, the drive block 21 is allowed to turn only in the directions toward the first tightening recess 331 and the second tightening recess 341, as shown in FIG. 7. Now referring to FIG. 8, the drive block 21 has so turned that the drive block 21 and the stop block 30 are in the tightening state, and that the first end 22 of the drive block 21 is retained in the first tightening recess 331, and that the second end 23 of the drive block 21 is retained in the second tightening recess 341. In the meantime, the first end 22 of the drive block 21 is stopped by the first check edge 371 of the first protrusion 37, whereas the second end 23 of the drive block 21 is stopped by the first check edge 381 of the second protrusion 38. The drive block 21 is thus securely located such that the first end 22 and the second end 23 of the drive block 21 are retained respectively in the first tightening recess 331 and the second tightening recess 341. The drive block 21 is therefore not vulnerable to rotation at the time when the outer tube 10 is twisted inadvertently. In addition, the first protrusion 37 and the second protrusion 38 of the present invention are not vulnerable to damage which may be caused by the impact of the drive block 21 in motion.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. An expandable rod assembly for a tree pruner comprising:

an outer tube;

an inner tube slidably fitted within said outer tube, said inner tube having a drive block at one end thereof, said drive block having a first end and a second end opposite to said first end;

a stop block means fitted over said drive block of said inner tube, said stop block means extending outwardly to engage an inner wall of said outer tube when said inner and said outer tube are rotated relative to each other in one direction and releasing from said inner wall of said outer tube when said inner tube and said outer tube are rotated relative to each other in an opposite direction, said stop block means comprising:

a stop block having an outer wall and an interior passageway, said drive block received in said interior passageway, said stop block having a longitudinal through slot extending through said outer wall so as to communicate with said interior passageway, said outer wall having an arcuate slot formed thereon in a location aligned with and opposite to said longitudinal through slot so as to define a pair of symmetrical areas on opposite sides of said arcuate slot and said longitudinal through slot, each of said pair of symmetrical areas having an inner wall, the inner wall of one of said pair of symmetrical areas having a first eccentric arcuate recess adjacent said arcuate slot, the inner wall of the other of said pair of symmetrical areas having a second eccentric arcuate recess adjacent said longitudinal through slot, said outer wall of said stop block having a ratchet portion formed on an exterior surface thereof, said first eccentric recess having a first tightening recess formed in said inner wall adjacent an end of said first eccentric recess opposite said arcuate slot, said first tightening recess extending deeper into said inner wall than said first eccentric recess, said second eccentric recess having a second tightening recess formed in said inner wall opposite said longitudinal through slot, said second tightening recess extending into said inner wall deeper than said second eccentric recess, said stop block having a first protrusion formed inwardly thereof adjacent an end of said first tightening recess opposite said first eccentric recess and having a second protrusion formed inwardly thereof adjacent an end of said second tightening recess opposite said second eccentric recess, said first protrusion having a first check edge extending angularly toward said first tightening recess and having a second check edge extending toward said longitudinal through slot, said second protrusion having a first check edge extending angularly toward said second tightening recess and a second check edge extending toward said arcuate slot, said stop block means engaging said first end of said drive block within said first tightening recess and against said first check edge of said first protrusion and engaging said second end of said drive block within said second tightening recess and against said first check edge of said second protrusion such that said outer wall of said stop block engages said inner wall of said outer tube.

* * * * *